(12) United States Patent
Srinivasan et al.

(10) Patent No.: US 11,222,278 B2
(45) Date of Patent: Jan. 11, 2022

(54) ESTIMATING CONDITIONAL PROBABILITIES

(71) Applicant: FUJITSU LIMITED, Kawasaki (JP)

(72) Inventors: Ramya Malur Srinivasan, Sunnyvale, CA (US); Ajay Chander, San Francisco, CA (US)

(73) Assignee: FUJITSU LIMITED, Kawasaki (JP)

( * ) Notice: Subject to any disclaimer, the term of this patent is extended or adjusted under 35 U.S.C. 154(b) by 1014 days.

(21) Appl. No.: 15/260,226

(22) Filed: Sep. 8, 2016

(65) Prior Publication Data

US 2018/0068229 A1 Mar. 8, 2018

(51) Int. Cl.
| | | |
|---|---|---|
| G06N 7/00 | (2006.01) | |
| G06Q 50/10 | (2012.01) | |
| G06Q 30/02 | (2012.01) | |
| G06Q 30/00 | (2012.01) | |
| G06N 3/08 | (2006.01) | |

(52) U.S. Cl.
CPC ............ *G06N 7/005* (2013.01); *G06N 3/08* (2013.01); *G06Q 30/01* (2013.01); *G06Q 30/02* (2013.01); *G06Q 50/10* (2013.01)

(58) Field of Classification Search
CPC .......... G06N 3/08; G06N 7/005; G06Q 30/01; G06Q 30/02; G06Q 50/10
See application file for complete search history.

(56) References Cited

U.S. PATENT DOCUMENTS

| 2004/0111479 A1 | 6/2004 | Borden et al. |
| 2008/0096533 A1 | 4/2008 | Manfredi et al. |
| 2012/0310627 A1 | 12/2012 | Qi et al. |
| 2017/0364831 A1* | 12/2017 | Ghosh .................... G06F 11/30 |

FOREIGN PATENT DOCUMENTS

| JP | 2012-185727 A | 9/2012 |
| JP | 2012-215668 A | 11/2012 |
| JP | 2016-110284 A | 6/2016 |
| WO | 2015127110 A3 | 8/2015 |
| WO | 2006119437 A3 | 11/2016 |

OTHER PUBLICATIONS

Kim et al., "A Review on the Computational Methods for Emotional State Estimation from the Human EEG", Feb. 18, 2013, Computational and Mathematical Methods in Medicine, vol. 2013, pp. 1-14 (Year: 2013).*

(Continued)

*Primary Examiner* — Alan Chen
*Assistant Examiner* — Brent Johnston Hoover
(74) *Attorney, Agent, or Firm* — Maschoff Brennan

(57) ABSTRACT

A method of estimating one or more conditional probabilities may be provided. A method may include determining one or more states based on user input, and determining a similarity measurement between at least one state pair of one or more state pairs. The method may further include determining a likelihood of probability for the at least one state pair of the one or more state pairs. Moreover, the method may include estimating a conditional probability for the at least one state pair of the one or more state pairs based on the determined likelihood of probability and the determined one or more states.

14 Claims, 9 Drawing Sheets

(56) References Cited

OTHER PUBLICATIONS

Levy et al., "Neural Word Embedding as Implicit Matrix Factorization", 2014, Advances in Neural Information Processing Systems 27 (NIPS 2014), pp. 1-9 (Year: 2014).*

Xiang et al., "An Emotion Information Processing Model Based On a Mental State Transition Network" Nov. 1, 2005, 2005 International Conference on Natural Language Processing and Knowledge Engineering, pp. 668-673 (Year: 2005).*

Resnik et al., "Beyond LDA: Exploring Supervised Topic Modeling for Depression-Related Language in Twitter", Jun. 5, 2015, Proceedings of the 2nd Workshop on Computational Linguistics and Clinical Psychology: From Linguistic Signal to Clinical Reality, pp. 99-107 (Year: 2015).*

European Search Report for corresponding application No. 17164378, dated May 11, 2017.

European Office Action for corresponding application No. 17164378, dated Apr. 3, 2019.

Mikolov, Tomas, et al., "Distributed Representations of Words and Phrases and their Compositionality," Accepted to NIPS Oct. 16, 2013.

Barkan, Oren, "Bayesian Neural Word Embedding," Tel Aviv University, last revised Jun. 5, 2016.

Lebret, Rémi and Ronan Collobert, "Word Emdeddings through Hellinger PCA," Idiap Research Institute, submitted on Dec. 19, 2013.

Omer Levy and Yoav Goldberg, "Neural Word Embedding as Implicit Matrix Factorization," NIPS Sep. 10, 2014.

Kottur, Satwik, et al., "Visual Word2Vec: Learning Visually Grounded Word Embedings Using Abstract Scenes," last revised Jun. 29, 2016.

U.S. Appl. No. 15/143,479, filed Apr. 29, 2016.

U.S. Appl. No. 15/093,662, filed Apr. 7, 2016.

Madhabhushi et al., "A Bayesian Approach to Human Activity Recognition," IEEE Workshop on Visual Surveillance, Jun. 26, 1999.

Faria et al., "A Probabilistic Approach for Human Everyday Activities Recognition using Body Motion from RGB-D Images," The 23rd IEEE Symposium on Robot and Human Interactive Communication, Aug. 25, 2014.

Karthika Mohan, et al., "Graphical Models for Recovering Probabilistic and Causal Queries from Missing Data," Proceedings of NIPS, Cognitive Systems Laboratory, Computer Science Department, University of California, Nov. 2014.

Tim Rohe & Uta Noppeney, "Cortical Hierarchies Perform Bayesian Causal Inference in Multisensory Perception," PLOS Biology, Feb. 24, 2015.

Shams et al., "Causal inference in perception," Trends in Cognitive Science, vol. 9 pp. 425-3, Sep. 14, 2010.

EP Oral Proceedings in Application No. 17164378.6 dated Oct. 28, 2019.

Clavel and Callejas, "Sentiment Analysis: From Opinion Ming to Human-Agent Interaction", IEEE Transactions of Affective Computing, vol. 7, No. 1, Jan. 2016.

JP Office Action in Application No. 2017-143487 dated May 24, 2021.

\* cited by examiner

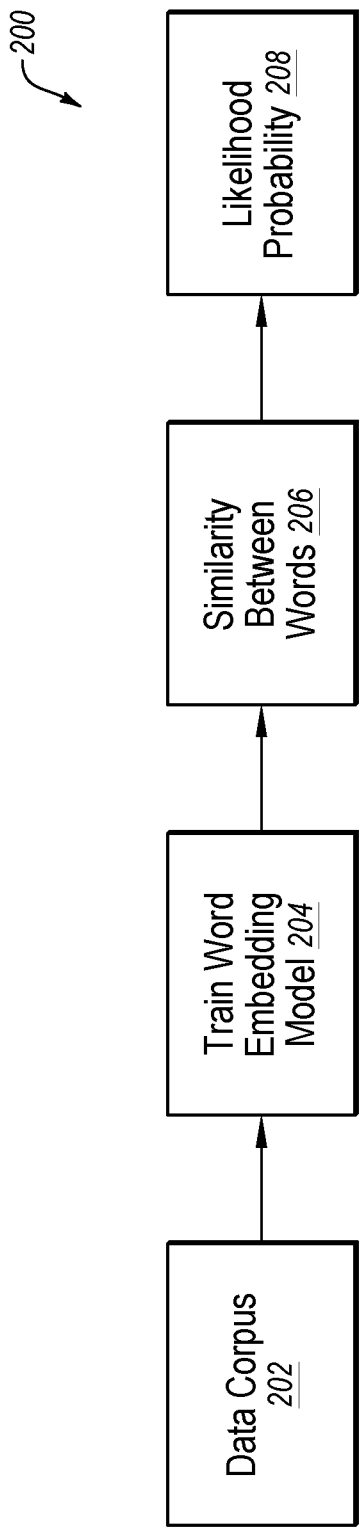
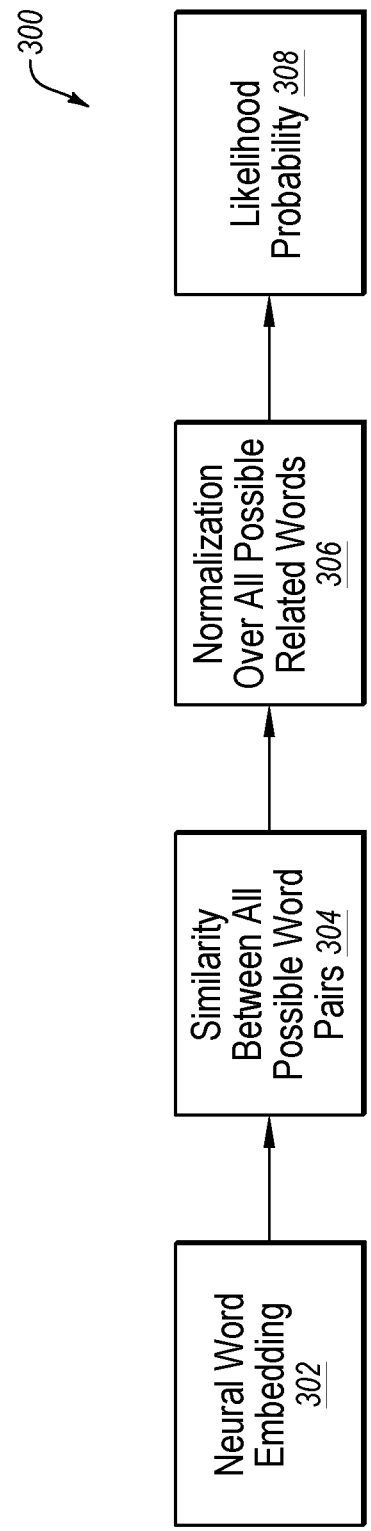
FIG. 4
FIG. 5

| Present State | Possible Transition States | | | |
|---|---|---|---|---|
| | Angry | Rage | Fear | Sad |
| Sad | 0.7 | 0.5 | 0.8 | 1 |

⇓ Normalization

| | P(anger/sad) | P(rage/sad) | P(fear/sad) | P(sad/sad) |
|---|---|---|---|---|
| Sad | 0.7/(0.7+.5+.8+1) = 0.23 | 0.5/3 = 0.166 | 0.8/3 = 0.266 | 1/3 = 0.333 |

*FIG. 6*

ESTIMATING CONDITIONAL PROBABILITIES

FIELD

The embodiments discussed herein relate to estimating conditional probabilities and, more specifically, to estimating the probability of one user state transitioning to another user state.

BACKGROUND

Online coaching websites have gained popularity in recent times. Users can get help from dedicated life coaches regarding various matters of concern, such as emotional wellness, physical health, etc.

The subject matter claimed herein is not limited to embodiments that solve any disadvantages or that operate only in environments such as those described above. Rather, this background is only provided to illustrate one example technology area where some embodiments described herein may be practiced.

SUMMARY

One or more embodiments of the present disclosure may include a method of estimating one or more conditional probabilities. The method may include determining one or more states based on user input, and determining a similarity measurement between at least one state pair of one or more state pairs. The method may further include determining a likelihood of probability for the at least one state pair of the one or more state pairs. Moreover, the method may include estimating a conditional probability for the at least one state pair of the one or more state pairs based on the determined likelihood of probability and the determined one or more states.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which:

FIG. 4 illustrates an example flow that may be used to determine similarities between words;

FIG. 5 is a diagram of an example flow that may be used to determine a likelihood of probability for one or more word pairs;

FIG. 6 depicts a hypothetical example of determining a likelihood of probability for a plurality of word pairs;

DESCRIPTION OF EMBODIMENTS

Figure 1:
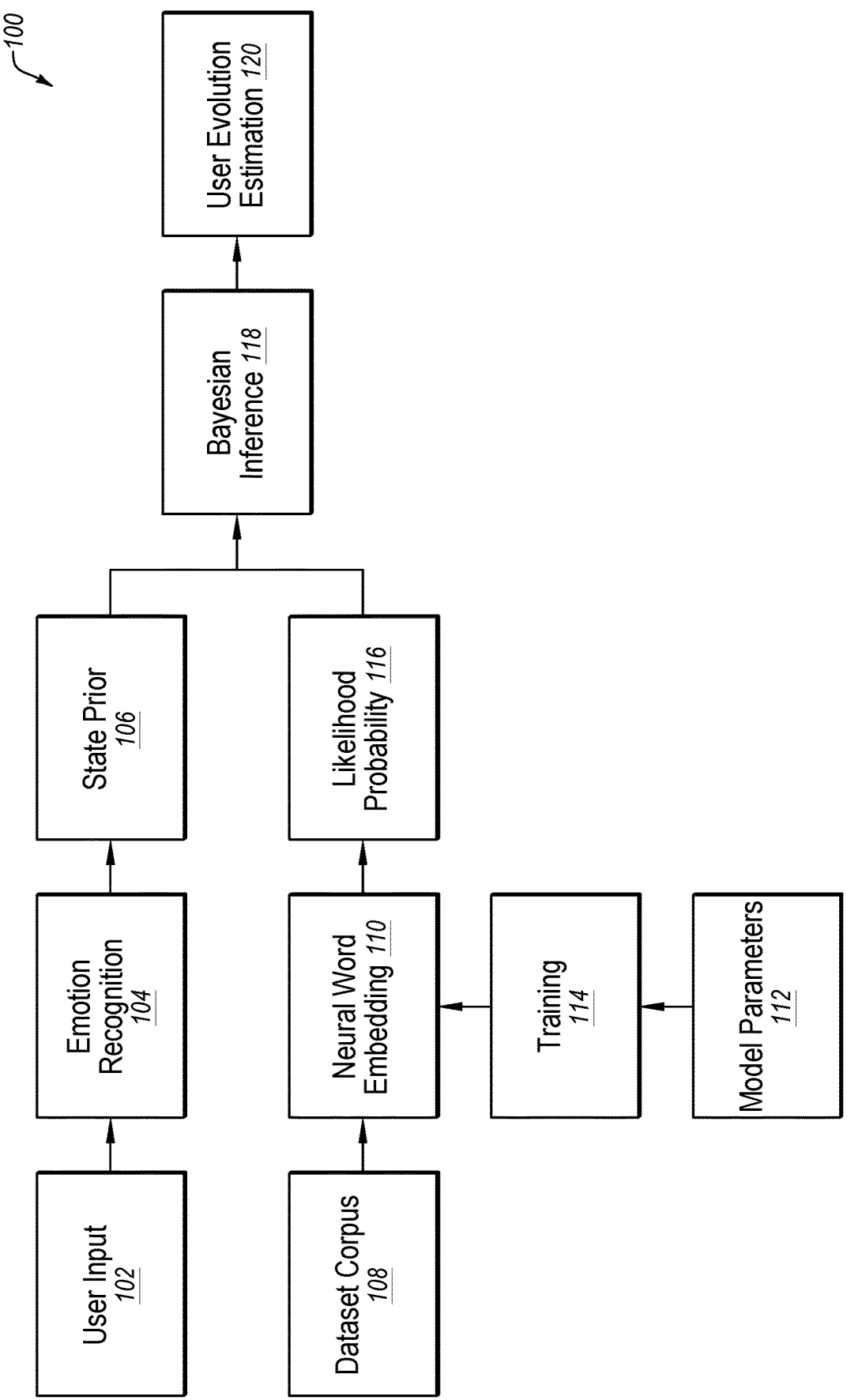
FIG. 1 is a diagram of an example flow that may be used to estimate conditional probabilities.

In order to help users in a timely and effective manner, it is important for an online coach to understand how a user is evolving during the course of a conversation. Understanding transitions in a users' emotional state ("user evolution") may help the coach in deciding the next advice to be given to the user.

Various embodiments of the present disclosure may relate to estimating conditional probabilities. More specifically, for example, various embodiments may be used to estimate a probability of one state leading to another state, wherein a "state" may include an emotional state (e.g., happy, angry, etc.) or a cognitive state (e.g., interested, uninterested). In one example application, various embodiments may help a coach (e.g., an online coach) understand how a user's state of mind is progressing ("user evolution") during the course of a conversation, and, therefore, understand how the user is responding to their advice.

A word embedding is a parameterized function for mapping words in some language to high-dimensional vectors (e.g., typically hundreds). If a method to generate the aforementioned mapping is a neural network, the resulting word embedding is a neural word embedding. Other methods include dimensionality reduction on word co-occurrence matrix, etc. Word embeddings/phrase embeddings, when used as the underlying representations, have shown good performance in many natural language processing tasks. Of particular interest has been the "Word2Vec" neural embedding. "Word2vec" is a group of related models, which are shallow, two-layer neural networks, trained to reconstruct linguistic contexts of words to produce word embeddings.

Given enough data, usage, and context, Word2vec may make highly accurate guesses about a word's meaning based on past appearances of the word. These guesses may be used to establish a word's association with other words (e.g. "man" is to "boy" what "woman" is to "girl"), etc.

Various embodiments of the present disclosure may extend the Word2Vec neural embeddings (e.g., with a method and framework) to learn causal relationships between actions and/or events, and incorporate word-level emotional semantics as likelihood probabilities in a Bayesian framework along with prior states as computed from the emotion underlying the input (e.g., text), and subsequently estimate conditional probabilities to understand user evolution. For example, if P(A) represents the probability of user being sad and P(B)=represents the probability of user being angry, the probability of anger arising out of sadness (P(B/A)) may be determined.

"Visual Word2Vec" is a model that learns visually grounded word embeddings to capture visual notions of semantic relatedness. Visual Word2Vec may learn to predict the visual grounding as context for a given word. Although "eating" and "stares at" seem unrelated in text, they share semantics visually. Visual Word2Vec shows consistent improvements over Word2Vec for common sense assertion classification, visual paraphrasing, and text based image retrieval. However, Visual Word2Vec does not model causal relationships between objects and people (e.g., what made the girl to stare at the ice cream? How was one girl influenced by the other?). Learning such causal relationships may benefit in deriving a rich vocabulary that is capable of inferring influence patterns and thereby enhance capabilities, and also benefit psychological studies by providing an independent and complementary source of evidence in understanding human behavior.

Bayes' theorem, which may be used for statistical inference in various fields such as science, sports, law, philosophy, etc., describes the probability of an event based on conditions that might be related to the event. For example, If A and B are two events with probabilities P(A) and P(B), respectively, Bayes' theorem states that the probability of B given that A has occurred is given by:

$$P(B/A)=P(A/B)P(B))/(P(A). \quad (1)$$

A slightly modified version of equation (1) is:

$$P(B/A)=P(A/B)P(B)/\Sigma_i P(A/B_i)P(B_i); \quad (2)$$

wherein P(A) is expressed as a total probability over all possible states $B_i$ that may result in A.

For example, if P(A) represents the probability of a user being sad and P(B) represents the probability of the user being angry, the probability of anger arising out of sadness may be determined via: computing similarity(A, B) from word embeddings, estimating P(B) from an emotion recognition algorithm on an input (e.g., text), and computing P(B/A), which is a measure of a conditional probability, via equation (2) above. One or more estimated conditional probabilities may be used to estimate user evolution (e.g., evolution of the user's mindset during the course of a conversation).

In various embodiments, multiple influencing parameters may be incorporated. For example, if P(A) represents the probability of sadness, P(B) represents that probability of anger, and P(C) represents the probability of rage, the probability of rage given sadness and anger P(C/A,B) may be determined as follows: P(C/A) and P(B) may be determined as described above, and P(C/A,B), which is a measure of causal influence of more than one state on another, may be determined via the following equation:

$$P(C/A)=P(C/(A,B))P(B). \quad (3)$$

The Bayes' inference theory has been used to understand many kinds of causal phenomena in computer vision (e.g., for human action detection and activity recognition), in economics for understanding problems of attrition and to characterize the recovery of causal effects from data corrupted by attrition, and determining that the functioning of the brain could be mapped to some kind of Bayesian framework. The Bayes' inference theory has also been used in the cognitive science community (e.g., to explore computational models of perception, which in turn are related to physiology of the brain). However, none of the aforementioned causal phenomena determines how one state of mind leads to another.

Various embodiments described herein may provide a quantitative modeling of sequence of mindsets/emotions, and specifically estimate the probabilities of one affect causing another.

Embodiments of the present disclosure are now explained with reference to the accompanying drawings.

FIG. 1 is a diagram of an example flow 100 that may be used to estimate conditional probabilities, in accordance with at least one embodiment of the present disclosure. Flow 100 may be performed by any suitable system, apparatus, or device. For example, device 800 of FIG. 10 or one or more of the components thereof may perform one or more of the operations associated with flow 100. In these and other embodiments, program instructions stored on a computer readable medium may be executed to perform one or more of the operations of flow 100.

At block 104, based on user input 102 (e.g., text provided by a user to an online coach), one or more states of a user may be recognized to determine one or more state priors 106. For example only, topic modeling and/or relevance weighting may be used to recognize or more states of the user. Further, as an example, the one or more state priors may include one or more emotional states, such as joy, anger, worry, etc. and/or one or more cognitive states, such as optimism, interest, disinterest, etc.

At block 114, based on one or more model parameters 112, a training process may generate a model for determining a similarity measurement between two words (e.g., how two words are related; a "relatedness of two words"). For example, model parameters may include a number of layers in a neural network, a required degree of precision, a minimum word count (e.g., a minimum number of times words must occur together to be considered related), etc.

At block 110, based on the model received via block 114 and a dataset corpus 108, a similarity (e.g., a relatedness) measurement between two or more words may be determined. For example, dataset corpus 108 may include any source of data, such as news articles, webpages, blogs, etc.

At block 116, based on data received via block 110 (e.g., similarity measurement between words), a likelihood of probability for one or more word pairs may be determined. For example, a likelihood of two states (e.g., two emotional states) occurring together may be determined. More specifically, as an example, if a user is sad, a likelihood of the user being angry may be determined, a likelihood of the user experiencing rage may be determined, and/or a likelihood of the user being fearful may be determined. It is noted that likelihood probabilities may be estimated from word embeddings after normalizing the similarities between words.

At block 118, based on state priors 106 and data generated via block 116, a Bayesian inference may be used to estimate a conditional probability (e.g., a user evolution estimation 120).

For example, $e_p$ may represent computed state priors, such as, for example, P(sad)=0.1, P(rage)=0.2, P(angry)=0.2 and P(fear)=0.5, and related states $e_n$ includes rage, anger and fear. As described above, likelihood probabilities $P(e_p/e_n)$ (estimated from word embeddings after normalizing the similarity between words), for various possible cases may be determined. Further, using equation (2) in the aforementioned scenario provides the following equation:

$$P((E_N=e_n)/(E_p=e_n)=P(e_p/e_n)P(e_n)/\Sigma_n P(e_p/e_n)P(e_n). \quad (4)$$

Further, substituting the probability values and using equation (4), it may be determined, for example, the probability of a user being sad provided that the user is angry P(sad/angry)=0.07/0.74~9%. Estimated conditional probabilities may be used to estimate user evolution (e.g., evolution of the user's mindset during the course of a conversation).

Modifications, additions, or omissions may be made to the flow 100 without departing from the scope of the present disclosure. For example, the operations of flow 100 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments. In short, flow 100 is merely one example of estimating a conditional probability and the present disclosure is not limited to such.

Figure 2:
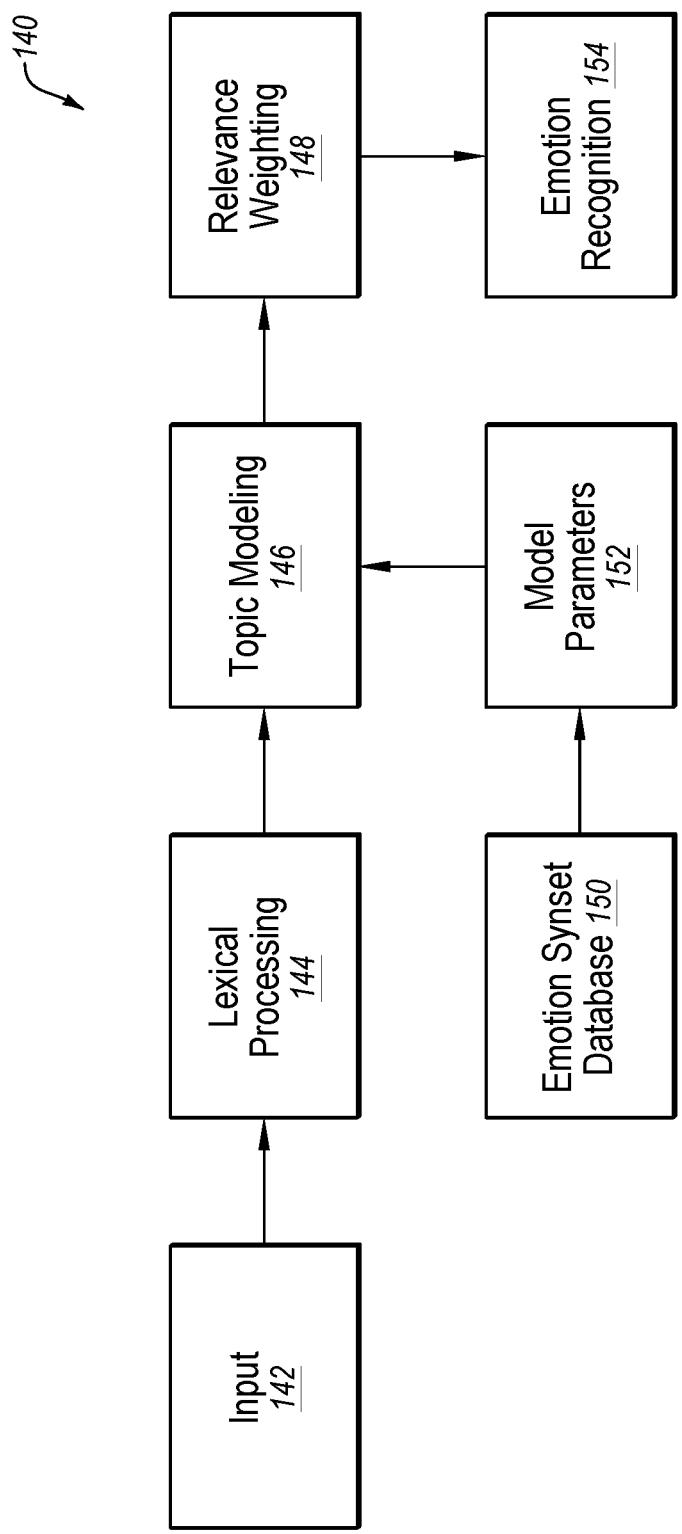
FIG. 2 illustrates an example flow that may be used for emotion recognition.

FIG. 2 is a diagram of an example flow 140 that may be used for emotion recognition, in accordance with at least one embodiment of the present disclosure. In one embodiment, block 104 shown in flow 100 of FIG. 1 may include flow 140. Flow 140 may be performed by any suitable system, apparatus, or device. For example, device 800 of FIG. 10 or one or more of the components thereof may perform one or more of the operations associated with flow 140. In these and other embodiments, program instructions stored on a computer readable medium may be executed to perform one or more of the operations of flow 140.

At block 142, input may be received, and flow 140 may proceed to block 144. For example, the input may include text submitted by a user.

At block 144, the user input may be processed and flow 140 may proceed to block 146. For example, the user input may be processed via Lexical processing, to correct spelling, remove "stop words," etc.

At block 146, topic modeling may be performed on received text (e.g., clean text generate via block 144) and based on model parameters 152, which may be based on data from an emotion synset database 150. The topic modeling may identify one or more top words for each topic. For example, topic modeling may be based on a latent Dirichlet allocation (LDA) model. Further, for example, model parameters 152 may be related to vocabulary, documents, a number of iterations, a number of topics, hyper-parameter for topic proportions, etc.

At block 148, based on top words received via block 146, the tops words may be weighed based on relevance to an emotion, and flow 140 may proceed to block 154. At block 154, based on an emotion weight vector for the user input (e.g., text), one or more emotions of a user may be recognized.

Modifications, additions, or omissions may be made to the flow 140 without departing from the scope of the present disclosure. For example, the operations of flow 140 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments. In short, flow 140 is merely one example of recognizing emotion and the present disclosure is not limited to such.

Figure 3:
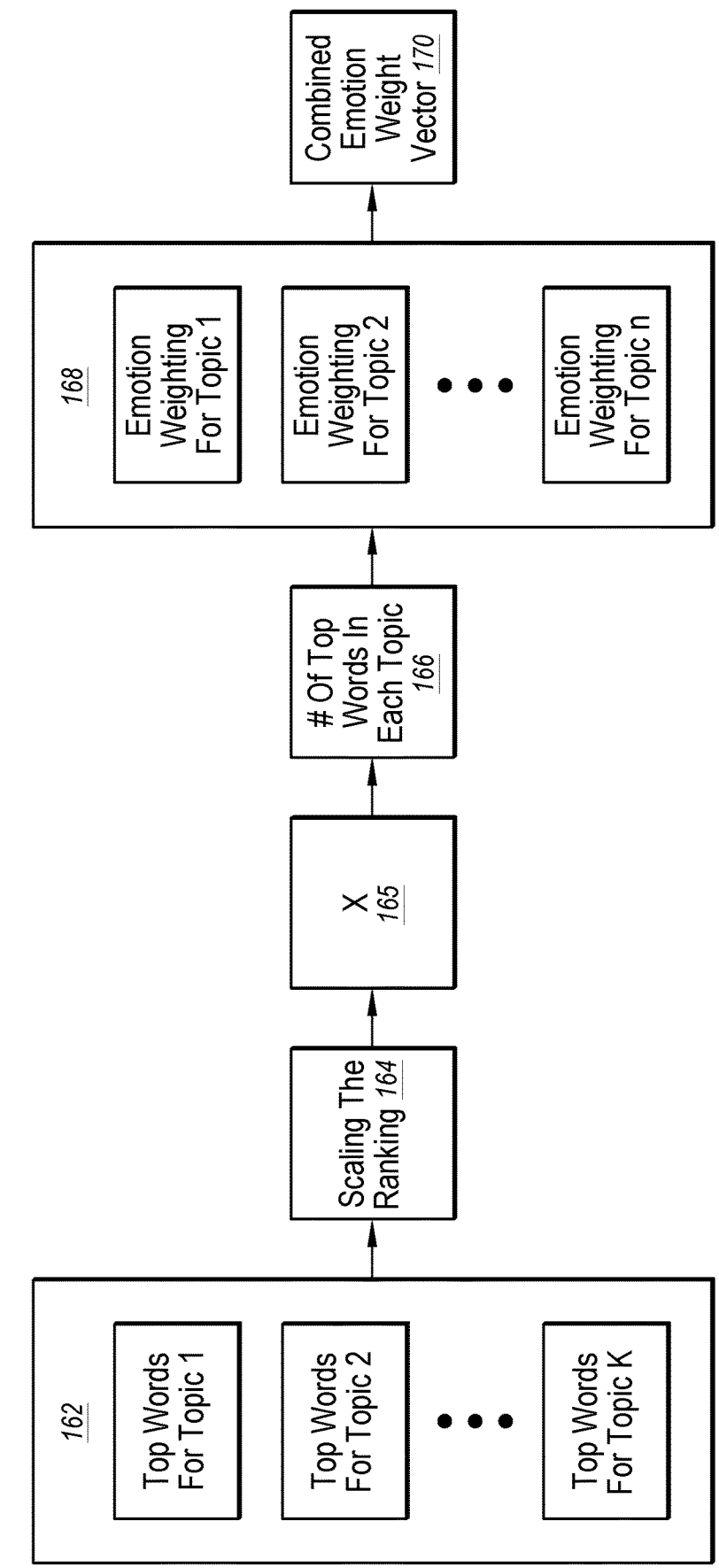
FIG. 3 is a diagram of an example flow that may be used for relevance weighting.

FIG. 3 is a diagram of an example flow 160 that may be used for relevance weighting, in accordance with at least one embodiment of the present disclosure. In one embodiment, block 148 shown in flow 140 of FIG. 2 may include flow 160. Flow 160 may be performed by any suitable system, apparatus, or device. For example, device 800 of FIG. 10 or one or more of the components thereof may perform one or more of the operations associated with flow 160. In these and other embodiments, program instructions stored on a computer readable medium may be executed to perform one or more of the operations of flow 160.

At block 162, top words for one or more topics may be identified, and flow 160 may proceed to block 164. For example, the top words for each topic, identified from textual input, may be identified via an LDA module.

At block 164, a ranking of top words may be scaled, and flow 160 may proceed to block 165. For example, the top words may be scaled via an inverse scaling of word ranks for each topic. In one example, a top word in a topic may receive a higher rank than a second top word. More specifically, for example, a top word of a topic may be assigned a weight of 1, and a second top word for the topic may be assigned a weight of 0.5.

At block 165, an element-wise matrix multiplication may be performed on each topic to identify a number of top words in each topic 166, and flow 160 may proceed to block 168. At block 168, emotion weighting may be performed for each topic, and a combined emotion weight vector 170 may be generated.

Modifications, additions, or omissions may be made to the flow 160 without departing from the scope of the present disclosure. For example, the operations of flow 160 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments. In short, flow 160 is merely one example of weighting relevance and the present disclosure is not limited to such.

FIG. 4 is a diagram of an example flow 200 that may be used to determine similarities between words, in accordance with at least one embodiment of the present disclosure. In one embodiment, flow 200 may include blocks 108, 110, 112, 114, and 116 shown in flow 100 of FIG. 1. Flow 200 may be performed by any suitable system, apparatus, or device. For example, device 800 of FIG. 10 or one or more of the components thereof may perform one or more of the operations associated with flow 200. In these and other embodiments, program instructions stored on a computer readable medium may be executed to perform one or more of the operations of flow 200.

At block 204, based on data corpus 202, a training process may generate a model for determining similarity between two words (e.g., a similarity measurement between two words) 206. For example, the training process may be based on a number words (e.g., 100 billion words). Further, for example, data corpus 202 may include any source of data, such as news articles, webpages, blogs, etc.

At block 208, based on data received via block 206 (e.g., similarity between words), a likelihood of probability for word pairs may be determined. For example, a likelihood of two states (e.g., two emotional states) occurring together may be determined. More specifically, as an example, if a user is sad, a likelihood of the user being angry may be determined, a likelihood of the user experiencing rage may be determined, and/or a likelihood of the user being fearful may be determined.

Modifications, additions, or omissions may be made to the flow 200 without departing from the scope of the present disclosure. For example, the operations of flow 200 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments. In short, flow 200 is merely one example of determining similarity between words and the present disclosure is not limited to such.

FIG. 5 is a diagram of an example flow 300 that may be used in determining likelihood of probability, in accordance with at least one embodiment of the present disclosure. In one embodiment, blocks 110 and 116 shown in flow 100 of FIG. 1 may include flow 300. Flow 300 may be performed by any suitable system, apparatus, or device. For example, device 800 of FIG. 10 or one or more of the components thereof may perform one or more of the operations associated with flow 300. In these and other embodiments, program instructions stored on a computer readable medium may be executed to perform one or more of the operations of flow 300.

At block 302, via a neural word embedding model, a similarity (e.g., a relatedness) between possible word pairs (e.g., state pairs) 304 may be determined. For example, with reference to FIG. 6, which depicts a hypothetical example, a present state is "sad" and the possible transition states are "angry," "rage," "fear," and "sad." As illustrated, in this example, a similarity measurement between "sad" and "angry" is 0.7, a similarity measurement between "sad" and "rage" is 0.5, a similarity measurement between "sad" and "fear" is 0.8, and a similarity measurement between "sad" and "sad" is 1.

With reference again to FIG. 5, at block 306, the similarity (e.g., a relatedness) between possible word pairs 304 may be normalized to determine a likelihood of probability 308 for word pairs. With reference again to FIG. 6, in this example, after normalization, the likelihood of probability that "sad" transitions to "angry" (P(anger/sad)) is 0.23, the likelihood of probability that "sad" transitions to "rage" (P(rage/sad)) is 0.166, the likelihood of probability that "sad" transitions to "fear" (P(fear/sad)) is 0.266, and the likelihood of probability that "sad" transitions to "sad" (P(sad/sad)) is 0.333.

Modifications, additions, or omissions may be made to the flow 300 without departing from the scope of the present disclosure. For example, the operations of flow 300 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments. In short, flow 300 is merely one example of determining likelihood of probability and the present disclosure is not limited to such.

Figure 7:
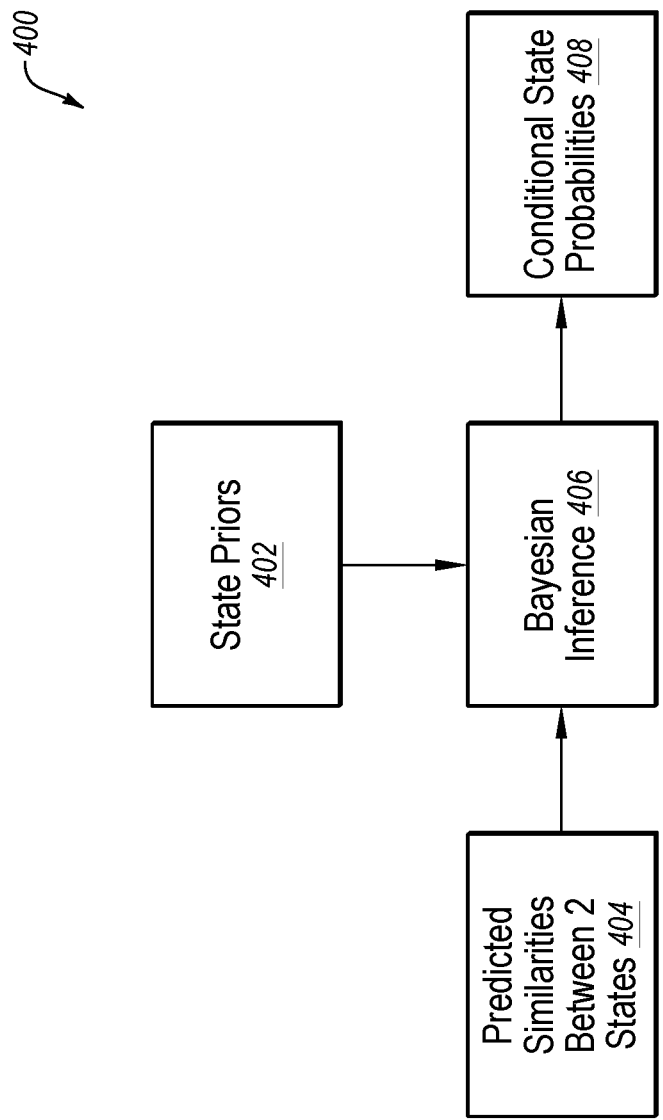
FIG. 7 illustrates an example flow that may be used to estimating conditional state probabilities.

FIG. 7 is a diagram of an example flow 400 that may be used to determine conditional state probabilities, in accordance with at least one embodiment of the present disclosure. Flow 400 may be performed by any suitable system, apparatus, or device. For example, device 800 of FIG. 10 or one or more of the components thereof may perform one or more of the operations associated with flow 400. In these and other embodiments, program instructions stored on a computer readable medium may be executed to perform one or more of the operations of flow 400.

At block 406, a Bayesian inference, based on state priors 402 (e.g., desire, anger, hunger, etc. computed from emotion recognition on text) and a similarity between two states 404 (e.g., how much are the two states related) (e.g., similarity (desire, greed) determined via a neural word embedding module), may be used to determine conditional state probabilities 408 (e.g., how much, in general, does one state (e.g., desire) influence another state (e.g., greed)). Estimated conditional probabilities may be used to estimate user evolution (e.g., evolution of the user's mindset during the course of a conversation).

Modifications, additions, or omissions may be made to the flow 400 without departing from the scope of the present disclosure. For example, the operations of flow 400 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments. In short, flow 400 is merely one example of a conditional probability and the present disclosure is not limited to such.

Figure 8:
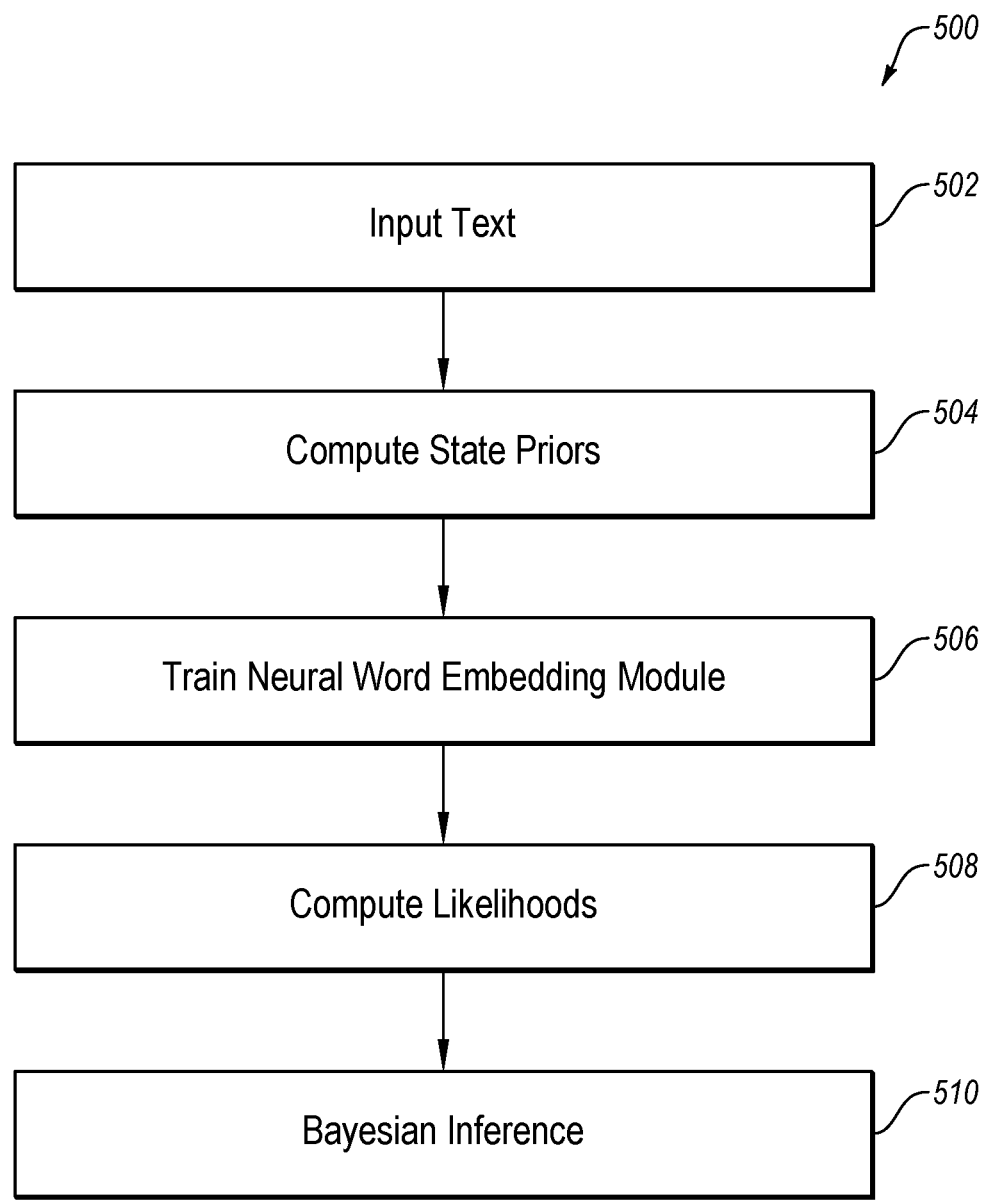
FIG. 8 is a flowchart of an example method for estimating conditional probabilities.

FIG. 8 is a flowchart of an example method 500 for estimating a conditional probability, in accordance with at least one embodiment of the present disclosure. Method 500 may be performed by any suitable system, apparatus, or device. For example, device 800 of FIG. 10 or one or more of the components thereof may perform one or more of the operations associated with method 500. In these and other embodiments, program instructions stored on a computer readable medium may be executed to perform one or more of the operations of method 500.

Figure 9:
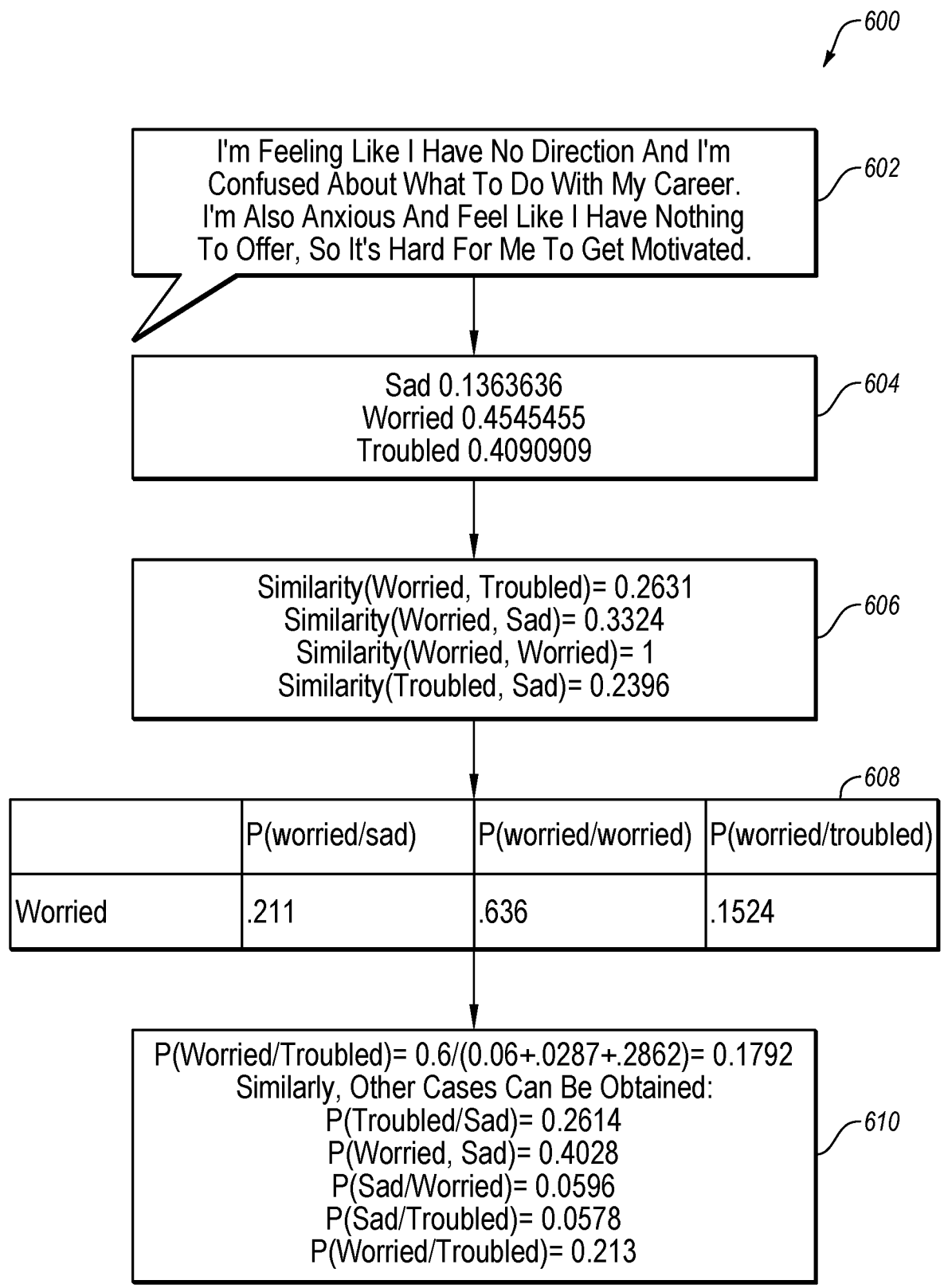
FIG. 9 depicts a hypothetical example of estimating conditional probabilities.

At block 502, input provided by a user may be received, and method 500 may proceed to block 504. For example, input (e.g., text) provided by a user of an online coaching program, may be received. More specifically, for example, with reference to FIG. 9, which depicts a hypothetical example, input 602 provided by a user may be received.

With reference again to FIG. 8, at block 504, prior states of the user may be determined, and method 500 may proceed to block 506. For example, with reference again to FIG. 9, prior states 604 may indicate that the user is approximately 13% sad, approximately 45% worried, and approximately 41% troubled.

With reference again to FIG. 6, at block 506, a neural word embedding model may be trained and determine the similarities between state pairs, and method 500 may proceed to block 508. For example, with reference again to FIG. 9, as depicted via reference numeral 606, a similarity between "worried" and "troubled" may be 0.2631, a similarity between "worried" and "sad" may be 0.3324, a similarity between "worried" and "worried" may be 1, and a similarity between "troubled" and "sad" may be 0.2396.

With reference again to FIG. 8, at block 508, a likelihood of probability for state pairs may be computed, and method 500 may proceed to block 510. For example, with reference again to FIG. 9, as depicted via reference numeral 608, the likelihood of probability that "sad" transitions to "worried" (P(worried/sad)) is 0.211, the likelihood of probability that "worried" transitions to "worried" (P(worried/worried)) is 0.636, and the likelihood of probability that "troubled" transitions to "worried" (P(worried/troubled)) is 0.1524.

With reference again to FIG. 8, at block 510, a Bayesian inference may be used to determine estimated conditional probabilities. For example, with reference again to FIG. 9, estimated conditional probabilities (probability of one affect causing another) 610 for various states are depicted. Estimated conditional probabilities may be used to estimate user evolution (e.g., evolution of the user's mindset during the course of a conversation).

Modifications, additions, or omissions may be made to method 500 without departing from the scope of the present disclosure. For example, the operations of method 500 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

One or more estimated conditional probabilities may be used to estimate user evolution (e.g., evolution of the user's mindset during the course of a conversation). More specifically, one or more estimated conditional probabilities may be used to estimate a probability of one affect state (e.g., sad) leading to another (e.g., angry). Estimation user evolution may help coaches make more informed decisions with respect to a user's mindset, and may further help make better personalized recommendations. Further, estimating user evolution may help coaches evaluate themselves to determine if their advice to a user is effective.

One potential application of various embodiments of the present disclosure includes understanding user interactions/actions to generate more effective personalized advice. Another potential application involves conversational agents, wherein framing of a next question by a "bot" in response to a user's action/mental state may be better customized. In this example, multi-modal inputs such as voice, text, video, image, etc. may be used. In addition, in anomaly detection, such as in surveillance/security related applications, various embodiments may detect events of low probability and signal a warning.

Figure 10:
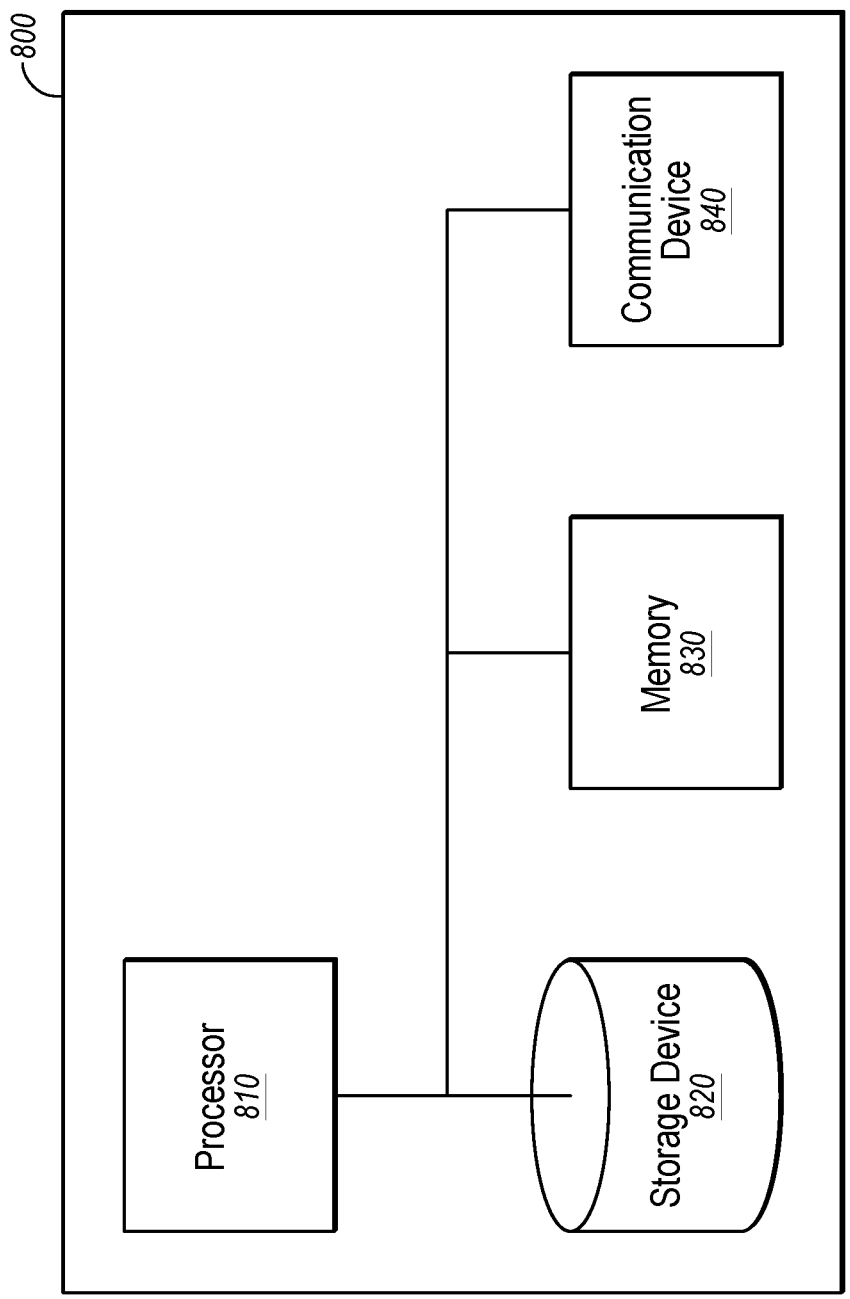
FIG. 10 is a block diagram of an example computing device.

FIG. 10 is a block diagram of an example computing device 800, in accordance with at least one embodiment of the present disclosure. Computing device 800 may include a desktop computer, a laptop computer, a server computer, a tablet computer, a mobile phone, a smartphone, a personal digital assistant (PDA), an e-reader device, a network switch, a network router, a network hub, other networking devices, or other suitable computing device.

Computing device 800 may include a processor 810, a storage device 820, a memory 830, and a communication device 840. Processor 810, storage device 820, memory 830, and/or communication device 840 may all be communicatively coupled such that each of the components may communicate with the other components. Computing device 800 may perform any of the operations described in the present disclosure.

In general, processor 810 may include any suitable special-purpose or general-purpose computer, computing entity, or processing device including various computer hardware or software modules and may be configured to execute instructions stored on any applicable computer-readable storage media. For example, processor 810 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 8, processor 810 may include any number of processors configured to perform, individually or collectively, any number of operations described in the present disclosure.

In some embodiments, processor 810 may interpret and/or execute program instructions and/or process data stored in storage device 820, memory 830, or storage device 820 and memory 830. In some embodiments, processor 810 may fetch program instructions from storage device 820 and load the program instructions in memory 830. After the program instructions are loaded into memory 830, processor 810 may execute the program instructions.

For example, in some embodiments one or more of processing operations for estimating conditional probabilities may be included in data storage 820 as program instructions. Processor 810 may fetch the program instructions of one or more of the processing operations and may load the program instructions of the processing operations in memory 830. After the program instructions of the processing operations are loaded into memory 830, processor 810 may execute the program instructions such that computing device 800 may implement the operations associated with the processing operations as directed by the program instructions.

Storage device 820 and memory 830 may include computer-readable storage media for carrying or having computer-executable instructions or data structures stored thereon. Such computer-readable storage media may include any available media that may be accessed by a general-purpose or special-purpose computer, such as processor 810. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 810 to perform a certain operation or group of operations.

In some embodiments, storage device 820 and/or memory 830 may store data associated with estimating conditional probabilities. For example, storage device 820 and/or memory 830 may store state priors, neural word embedding models, data related to likelihood probabilities, data related to similarity of word pairs, etc.

Communication device 840 may include any device, system, component, or collection of components configured to allow or facilitate communication between computing device 800 and another electronic device. For example, communication device 840 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a Wi-Fi device, a WiMAX device, cellular communication facilities, etc.), and/or the like. Communication device 840 may permit data to be exchanged with any network such as a cellular network, a Wi-Fi network, a MAN, an optical network, etc., to name a few examples, and/or any other devices described in the present disclosure, including remote devices.

Modifications, additions, or omissions may be made to FIG. 8 without departing from the scope of the present disclosure. For example, computing device 800 may include more or fewer elements than those illustrated and described in the present disclosure. For example, computing device 800 may include an integrated display device such as a screen of a tablet or mobile phone or may include an external monitor, a projector, a television, or other suitable display device that may be separate from and communicatively coupled to computing device 800.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of estimating one or more conditional probabilities, comprising:
   obtaining user input comprising text provided by a user;
   processing the text via Lexical processing to generate a cleaned up version of the text, the Lexical processing including one or more of: removing stop words or correcting spelling;
   determining one or more current emotional or cognitive states of the user based on the cleaned up version of the text, the current emotional or cognitive states of the user being determined by performing topic modeling on the cleaned up version of the text to identify a plurality of top words and weighing top words based on relevance to a plurality of emotions or cognitive states;
   determining a similarity measurement between at least one state pair of one or more state pairs;
   determining a likelihood of probability for the at least one state pair of the one or more state pairs, wherein state pairs are two emotional or cognitive states and the determination corresponds to a determination of the likelihood of the two emotional or cognitive states occurring together; and
   estimating a conditional probability for the at least one state pair of the one or more state pairs based on the determined likelihood of probability and the determined one or more states, wherein the estimation corresponds to a determination of the current emotional or cognitive state of the user transitioning to the other emotional or cognitive state of the two emotional or cognitive states of the at least one state pair,
   wherein the estimating the conditional probability comprises determining the conditional probability via a Bayesian inference.

2. The method of claim 1, wherein the determining a similarity measurement between at least one state pair of one or more state pairs comprises determining the similarity measurement via a neural word embedding model.

3. The method of claim 2, wherein the determining the similarity measurement via a neural word embedding model comprises training the neural word embedding model based on one or model parameters.

4. The method of claim 1, wherein the determining a likelihood of probability for the at least one state pair of the one or more state pairs comprises normalizing each state pair over all possible state pairs of the one or more state pairs.

5. The method of claim 1, further comprising estimating a probability of a state of the user transitioning from one state of the at least one state pair to another state of the at least one state pair based on the determined conditional probability for the at least one state pair.

6. One or more non-transitory computer-readable media that include instructions that, when executed by one or more processors, are configured to cause the one or more processors to perform operations, the operations comprising:
   obtaining user input comprising text provided by a user;
   processing the text via Lexical processing to generate a cleaned up version of the text, the Lexical processing including one or more of: removing stop words or correcting spelling;
   determining one or more current emotional or cognitive states of the user based on the cleaned up version of the text, the current emotional or cognitive states of the user being determined by performing topic modeling on the cleaned up version of the text to identify a plurality of top words and weighing top words based on relevance to a plurality of emotions or cognitive states;
   determining a similarity measurement between at least one state pair of one or more state pairs;
   determining a likelihood of probability for the at least one state pair of the one or more state pairs, wherein state pairs are two emotional or cognitive states and the determination corresponds to a determination of the likelihood of the two emotional or cognitive states occurring together; and
   estimating a conditional probability for the at least one state pair of the one or more state pairs based on the determined likelihood of probability and the determined one or more states, wherein the estimation corresponds to a determination of the current emotional or cognitive state of the user transitioning to the other emotional or cognitive state of the two emotional or cognitive states of the at least one state pair, wherein the estimating the conditional probability comprises determining the conditional probability via a Bayesian inference.

7. The computer-readable media of claim 6, wherein the determining a similarity measurement between at least one state pair of one or more state pairs comprises determining the similarity measurement via a neural word embedding model.

8. The computer-readable media of claim 7, wherein the determining the similarity measurement via a neural word embedding model comprises training the neural word embedding model based on one or model parameters.

9. The computer-readable media of claim 6, the operations further comprising estimating a probability of a state of the user transitioning from one state of the at least one state pair to another state of the at least one state pair based on the determined conditional probability for the at least one state pair.

10. The computer-readable media of claim 6, wherein the determining a likelihood of probability for the at least one state pair of the one or more state pairs comprises normalizing each state pair over all possible state pairs of the one or more state pairs.

11. A system, comprising:
one or more processors configured to:
obtain user input comprising text provided by a user;
process the text via Lexical processing to generate a cleaned up version of the text, the Lexical processing including one or more of: removing stop words or correcting spelling;
determine one or more current emotional or cognitive states of the user based on the cleaned up version of the text, the current emotional or cognitive states of the user being determined by performing topic modeling on the cleaned up version of the text to identify a plurality of top words and weighing top words based on relevance to a plurality of emotions or cognitive states;
determine a similarity measurement between at least one state pair of one or more state pairs;
determine a likelihood of probability for the at least one state pair of the one or more state pairs, wherein state pairs are two emotional or cognitive states and the determination corresponds to a determination of the likelihood of the two emotional or cognitive states occurring together; and
estimate a conditional probability for the at least one state pair of the one or more state pairs based on the determined likelihood of probability and the determined one or more states, wherein the estimation corresponds to a determination of the current emotional or cognitive state of the user transitioning to the other emotional or cognitive state of the two emotional or cognitive states of the at least one state pair,
wherein the estimating the conditional probability comprises determining the conditional probability via a Bayesian inference.

12. The system of claim 11, wherein the one or more processors are further configured to estimate a probability of the state of a user transitioning from one state of the at least one state pair to another state of the at least one state pair based on the determined conditional probability for the at least one state pair.

13. The system of claim 11, wherein the one or more processors are further configured to recognize at least one of one or more emotional states and one or more cognitive states of the user based on the user input to determine the one or more states.

14. The system of claim 11, wherein the one or more processors are further configured to determine the similarity measurement via a neural word embedding model.

* * * * *